United States Patent
Zhang et al.

(10) Patent No.: US 9,484,573 B2
(45) Date of Patent: Nov. 1, 2016

(54) COMPOSITE ANODE OF LITHIUM-ION BATTERIES

(71) Applicants: Hui Zhang, Morgantown, WV (US); Meng Yao, Morgantown, WV (US); Xingbo Liu, Morgantown, WV (US)

(72) Inventors: Hui Zhang, Morgantown, WV (US); Meng Yao, Morgantown, WV (US); Xingbo Liu, Morgantown, WV (US)

(73) Assignee: West Virginia University, Morgantown, WV (US)

(*) Notice: Subject to any disclaimer, the term of this patent is extended or adjusted under 35 U.S.C. 154(b) by 0 days.

(21) Appl. No.: 14/138,452

(22) Filed: Dec. 23, 2013

(65) Prior Publication Data

US 2014/0186701 A1    Jul. 3, 2014

Related U.S. Application Data

(60) Provisional application No. 61/747,451, filed on Dec. 31, 2012.

(51) Int. Cl.
*H01M 4/133* (2010.01)
*H01M 4/04* (2006.01)
*H01M 4/134* (2010.01)
*H01M 4/1393* (2010.01)
*H01M 4/1395* (2010.01)
*H01M 4/36* (2006.01)
*H01M 4/38* (2006.01)
*H01M 4/587* (2010.01)
*H01M 4/62* (2006.01)
*H01M 4/66* (2006.01)
*H01M 10/0525* (2010.01)

(52) U.S. Cl.
CPC ............ *H01M 4/133* (2013.01); *H01M 4/0457* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/587* (2013.01); *H01M 4/624* (2013.01); *H01M 4/625* (2013.01); *H01M 4/661* (2013.01); *H01M 10/0525* (2013.01); *Y02E 60/122* (2013.01); *Y02P 70/54* (2015.11)

(58) Field of Classification Search
CPC .................................................. H01M 4/0457
See application file for complete search history.

(56) References Cited

U.S. PATENT DOCUMENTS

| | | | |
|---|---|---|---|
| 7,828,619 B1 * | 11/2010 | Yeh | 445/49 |
| 7,842,535 B2 | 11/2010 | Green | |
| 8,062,556 B2 | 11/2011 | Peres et al. | |
| 8,080,335 B2 | 12/2011 | Kawakami et al. | |

(Continued)

OTHER PUBLICATIONS

Si, Q. et al., High Performance Si/C@CNF Composite Anode for Solid-Polymer Lithium-Ion Batteries, Journal of Power Sources, 2011, 6982-6986, vol. 196, Elsevier B. V.

(Continued)

*Primary Examiner* — Patrick Ryan
*Assistant Examiner* — Wyatt McConnell
(74) *Attorney, Agent, or Firm* — Buchanan Ingersoll & Rooney PC; Craig G. Cochenour (57) ABSTRACT

The present invention provides a composite anode for a battery comprising a copper current collector working electrode, at least one anode material comprising at least one of a carbon, a silicon, a conductive agent, and combinations thereof, wherein at least one anode material is deposited on a surface of the copper current collector working electrode to form the composite anode for a battery. An electrophoretic method for making this anode is provided. A lithium-ion battery having the composite anode is disclosed.

13 Claims, 9 Drawing Sheets

Schematic illustration for the preparation of silicon-carbon based composite anodes by EPD

(56) References Cited

U.S. PATENT DOCUMENTS

| | | | |
|---|---|---|---|
| 2011/0104551 A1* | 5/2011 | Yang et al. | 429/149 |
| 2011/0143018 A1* | 6/2011 | Peng et al. | 427/9 |
| 2012/0073971 A1* | 3/2012 | Prieto et al. | 204/490 |

OTHER PUBLICATIONS

Kim, I. et al., High Capacity Si/C Nanocomposite Anodes for Li-Ion Batteries, Journal of Power Sources, 2004, 145-149, vol. 136, Elsevier B.V.

Fuchsbichler, B. et al., High Capacity Graphite-Silicon Composite Anode Material for Lithium-Ion Batteries, Journal of Power Sources, 2011, 2889-2892, vol. 196, Elsevier B.V.

Ji, L. et al., Electrospun Carbon Nanofibers Containing Silicon Particles As An Energy-Storage Medium, Carbon, 2009, 3219-3226, vol. 47, Elsevier Ltd.

Lv, R. et al., Electrochemical Behavior of Nanoporous/Nanofibrous Si Anode Materials Prepared by Mechanochemical Reduction, Journal of Alloys and Compounds, 2010, 84-87, vol. 490, Elsevier B.V.

Wolf H. et al. Carbon-Fiber-Silicon-Nanocomposites for Lithium-Ion Battery Anodes by Microwave Plasma Chemical Vapor Deposition, Journal of Power Sources, 2009, 157-161, vol. 190, Elsevier B.V.

Gu, P. et al., Si/C Composite Lithium-Ion Battery Anodes Synthesized from Coarse Silicon and Citric Acid Through Combined Ball Milling and Thermal Pyrolysis, Electrochimica Acta, 2010, 3876-3883, vol. 55, Elsevier Ltd.

Guo, J. et al., A Porous Silicon-Carbon Anode with High Overall Capacity on Carbon Fiber Current Collector, Electrochemistry Communications, 2010, 981-984, vol. 12, Elsevier B.V.

Cui, L. et al., Carbon-Silicon Core-Shell Nanowires as High Capacity Electrode for Lithium Ion Batteries, Nano Letters, 2009, 3370-3374, vol. 9, No. 9, American Chemical Society.

Gomez Camer, J.L. et al., Nanosized Si/Cellulose Fiber/Carbon Composites as High Capacity Anodes for Lithium-Ion Batteries: A Galvanostatic and Dilatometric Study, Electrochimica Acta, 2009, 6713-6717, vol. 54, Elsevier Ltd.

Zheng, Y. et al., Nano-Porous Si/C Composites for Anode Material of Lithium-Ion Batteries, 2007, 5863-5867, vol. 52, Elsevier Ltd.

Magasinski, A. et al., High-Performance Lithium-Ion Anodes Using a Hierarchical Bottom-Up Approach, 2010, 353-358, vol. 9, Nature.com.

* cited by examiner

Fig. 1 Schematic illustration for the preparation of silicon-carbon based composite anodes by EPD Fig. 2. Schematic view for the formation of our novel anodes by using EPD method Fig.3. SEM images of (a) low magnification and (b) high magnification for the EPD-grown carbon nanofiber anodes.

Fig.4. (a) Charge-discharge capacity and columbic efficiency vs. cycle number, and (b) voltage profiles for the EPD-grown carbon nanofiber anodes cycled at 1C.

Fig.5. Surface morphologies of (a) low magnification and (b) high magnification for the EPD-grown silcon-carbon composite anodes.

Fig.6. (a) Charge-discharge capacity and columbic efficiency vs. cycle number, and (b) voltage profiles for the EPD-grown silicon-carbon composite anodes cycled at 1C.

COMPOSITE ANODE OF LITHIUM-ION BATTERIES

CROSS-REFERENCE TO RELATED APPLICATION

This utility patent application claims the benefit of pending U.S. Provisional Patent Application Ser. No. 61/747,451, filed on Dec. 31, 2012. The entire contents of U.S. Provisional Patent Application Ser. No. 61/747,451 is incorporated by reference into this utility patent application as if fully written herein.

STATEMENT REGARDING FEDERALLY SPONSORED RESEARCH OR DEVELOPMENT

Not applicable.

BACKGROUND OF THE INVENTION

1. Field of the Invention

This invention relates to a composite anode for Li-ion (lithium-ion) batteries. Specifically, the composite anode of this invention comprises a copper current collector working electrode, at least one anode material comprising at least one of a carbon, a silicon, a conductive agent, and combinations thereof, wherein at least one of the anode materials is deposited on a surface of the copper current collector working electrode to form the composite anode. An electrophoretic deposition method is provided for making the composite anode of this invention. A lithium-ion battery having the composite anode of this invention is also disclosed.

2. Description of the Background Art

Most of current available Li-ion batteries use various forms of carbon as anode. In recent years, silicon has been found to offer 10 times more energy density as compared to carbon anode. However, silicon anode suffers two major drawbacks: (1) low electronic conductivity, and (2) three times volume expansion during charging. To utilize the high energy density of silicon while minimize its drawbacks, various forms silicon-carbon composites have been developed and demonstrated to have very good performance. Most of these composites were manufactured with high-cost and multi-step chemical vapor deposition (CVD) methods. These methods require sophisticated and expensive equipment making them either undesirable or impracticable for implementation in manufacturing environment. They are also plagued by high processing temperatures and employment of toxic precursors (like SiH4).

Other background art is provided in the following technical publications or patents:
1. A. Magasinski, P. Dixon, B. Hertzberg, A. Kvit, J. Ayala and G. Yushin, Nature Materials, 9 (2010) 353358.
2. Li-Feng Cui, Yuan Yang, Ching-Mei Hsu, and Yi Cui, Nano Letters, 9 (2009) 3370-3374.
3. Juchen Guo, Ann Sun, Chunsheng Wang, Electrochemistry Communications 12 (2010) 981-984.
4. Peng Gu, Rui Cai, Yingke Zhou, Zongping Shao, Electrochimica Acta 55 (2010) 3876-3883.
5. H. Wolf, Z. Pajkic, T. Gerdes, M. Willert-Porada, Journal of Power Sources 190 (2009) 157-161.
6. Rongguan Lv, Jun Yang, Pengfei Gao, Yanna NuLi, Jiulin Wang, Journal of Alloys and Compounds 490 (2010) 84-87.
7. Liwen Ji, Xiangwu Zhang, Carbon 47 (2009) 3219-3226.
8. B. Fuchsbichlera, C. Stangl, H. Kren, F. Uhlig, S. Koller, Journal of Power Sources 196 (2011) 28892892.
9. Il-Seok Kim, Prashant N. Kumta, Journal of Power Sources 136 (2004) 145-149.
10. Q. Si, K. Hanai, T. Ichikawa, A. Hirano, N. Imanishi, O. Yamamoto, Y. Takeda, Journal of Power Sources 196 (2011) 6982-6986.
11. Ying Zheng, Jun Yang, Jiulin Wang, Yanna NuLi, Electrochimica Acta 52 (2007) 5863-5867.
12. J. L. Gomez Camer, J. Morales, L. Sanchez, P. Ruch, S. H. Ng, R. Koz, P. Novak, Electrochimica Acta 54 (2009) 6713-6717.
13. Green Mino, Structured silicon anode, U.S. Pat. No. 7,842,535.
14. Kawakami Soichiro, Tsuzuki Hidetoshi, Aiba Toshiaki, Ueno Rie, Watanabe Masatoshi, Powder material, electrode structure using the powder material, and energy storage device having the electrode structure, U.S. Pat. No. 8,080,335.
15. Peres Jean-Paul, Gillot Stephane, Saint Juliette, Morcrette Mathieu, Larcher Dominique, Tarascon Jean-Marie, Roca I Cabarrocas Pere, Nanocomposite material for the anode of a lithium cell, U.S. Pat. No. 8,062,556.

SUMMARY OF THE INVENTION

The present invention has met the above described needs. The present invention provides a composite anode for a lithium-ion battery comprising a copper current collector working electrode, at least one anode material comprising at least one of a carbon, a silicon, a conductive agent, and combinations thereof, wherein at least one of the anode materials is deposited on a surface of the copper current collector working electrode to form a composite anode for a lithium-ion battery. In a preferred embodiment of this invention, the composite anode described herein includes wherein the anode material comprises both carbon and silicon. In a more preferred embodiment of this invention the composite anode includes wherein the molar ratio of the carbon to the silicon of the anode materials ranges from about 50:1 to 1:20.

In another embodiment of this invention, the composite anode as described herein includes wherein the conductive agent is one or more selected from the group consisting of a polyacrylonitrile (PAN), a polyaniline (PANI), an acetylene black, a carbon black, a super P, a poly(ethylene oxide), or a lithium hydroxide.

In another embodiment of this invention, the composite anode as described herein includes wherein the carbon is in the form selected from the group consisting of a graphite, a graphene, a carbon nanoparticle, a carbon nanotube, a carbon fiber, and a carbon rod.

In another embodiment of this invention, the composite anode as described herein includes wherein the silicon is in the form selected from the group consisting of an Si powder, an Si nanowire, an Si nanoparticle, an Si sol particle, and an Si rod.

In another embodiment of this invention, the composite anode as described herein includes wherein the copper current collector working electrode is one material selected from the group consisting of a Cu grid, a Cu foil, and a Cu foam.

Another embodiment of this invention provides an electrophoretic deposition method of making a composite anode comprising providing at least one anode material comprising one or more of a carbon, a silicon, a conductive agent, and combinations thereof; placing at least one or more of the anode materials in an organic solution to form a suspension mixture of at least one of the anode material and the organic solution; immersing (i) a copper current collector working electrode, and (ii) a stainless steel counter electrode into the suspension mixture; delivering an effective amount of a direct current electric charge to the suspension mixture having the immersed working electrode and the counter electrode for a time period sufficient for charging the anode material and depositing the anode material on a surface of the working electrode for forming a composite anode; and optionally drying the composite anode. A preferred embodiment of this method includes placing the anode materials of carbon and silicon into the organic solution to form the suspension having carbon and silicon in the organic solution. In a more preferred embodiment of this method as described herein, the method includes wherein the molar ratio of the carbon to the silicon of the anode materials ranges from about 50:1 to 1:20.

In another embodiment of the method of this invention as described herein, the method includes wherein the conductive agent is one or more selected from the group consisting of a polyacrylonitrile (PAN), a polyaniline (PANI), an acetylene black, a carbon black, a super P, a poly(ethylene oxide), and a lithium hydroxide; the carbon is in the form selected from the group consisting of a graphite, a graphene, a carbon nanoparticle, a carbon nanotube, a carbon fiber, and a carbon rod; the silicon is in the form selected from the group consisting of an Si powder, an Si nanowire, an Si nanoparticle, an Si sol particle, and an Si rod; and the copper current collector working electrode is one material selected from the group consisting of a Cu grid, a Cu foil, and a Cu foam.

Another embodiment of the present invention includes a lithium-ion battery comprising at least one cathode, and at least one anode, wherein at least one anode is a composite anode comprising (i) a copper current collector working electrode, (ii) at least one anode material comprising at least one of a carbon, a silicon, a conductive agent, and combinations thereof, wherein at least one of the anode materials is deposited on a surface of the copper current collector working electrode to form the composite anode. In a preferred embodiment of this invention, the lithium-ion battery as described herein includes wherein the anode material comprises both carbon and silicon. In a most preferred embodiment of the lithium-ion battery of this invention, as described herein, the lithium-ion battery includes both carbon and silicon as anode materials wherein the molar ratio of the carbon to the silicon of the anode materials ranges from about 50:1 to 1:20.

Other embodiments of the lithium-ion battery of the present invention, as described herein include wherein the conductive agent is one or more selected from the group consisting of a polyacrylonitrile (PAN), a polyaniline (PANI), an acetylene black, a carbon black, a super P, a poly(ethylene oxide), and a lithium hydroxide; the carbon is in the form selected from the group consisting of a graphite, a graphene, a carbon nanoparticle, a carbon nanotube, a carbon fiber, and a carbon rod; the silicon is in the form selected from the group consisting of an Si powder, an Si nanowire, an Si nanoparticle, an Si sol particle, and an Si rod; and the copper current collector working electrode is one material selected from the group consisting of a Cu grid, a Cu foil, and a Cu foam.

Other details and advantages of the present invention will be more fully understood from the following description of the invention, examples, drawings, and claims appended hereto.

BRIEF DESCRIPTION OF THE DRAWINGS

FIG. 4($a$) shows the charge-discharge profiles and coulombic efficiency versus cycle number for the carbon nanofiber anodes of this invention, and FIG. 4($b$) shows the voltage profiles of the carbon nanofiber anodes of this invention.

FIG. 6($a$) shows the charge-discharge capacity and the coulombic efficiency versus cycle number for the silicon-carbon composite anodes of this invention, and FIG. 6($b$) shows the voltage profiles for the silicon-carbon anodes of this invention.

FIG. 8($a$) shows an SEM image of the EPD-grown modified silicon-carbon composite anode of the present invention of Example 3 at low magnification (MAGNIFICATION LEVEL: ×2000); FIG. 8($b$) shows an SEM image of the EPD-grown modified silicon-carbon composite anode of the present invention of Example 3 at high magnification (MAGNIFICATION LEVEL: ×10000); and FIG. 8($c$) is an EDX analysis that shows that the Si powder occupies about 20.16% in weight in the composite anode of this preferred embodiment of this invention of Example 3.

DETAILED DESCRIPTION

The present invention has met the above described needs. The present invention provides a composite anode for a lithium-ion battery comprising a copper current collector working electrode, at least one anode material comprising at least one of a carbon, a silicon, a conductive agent, and combinations thereof, wherein at least one of the anode materials is deposited on a surface of the copper current collector working electrode to form a composite anode for a lithium-ion battery. In a preferred embodiment of this invention, the composite anode described herein includes wherein the anode material comprises both carbon and silicon. In a more preferred embodiment of this invention the composite anode includes wherein the molar ratio of the carbon to the silicon of the anode materials ranges from about 50:1 to 1:20.

In another embodiment of this invention, the composite anode as described herein includes wherein the conductive agent is one or more selected from the group consisting of a polyacrylonitrile (PAN), a polyaniline (PANI), an acetylene black, a carbon black, a super P, a poly(ethylene oxide), and a lithium hydroxide. As used herein a "super P" is a conductive carbon black, such as for example a "Super P"

material and a "Super P Li" material commercially available from Timcal Graphite & Carbon, Westlake, Ohio, USA. In another embodiment of this invention, the composite anode as described herein includes wherein the carbon is in the form selected from the group consisting of a graphite, a graphene, a carbon nanoparticle, a carbon nanotube, a carbon fiber, and a carbon rod.

In another embodiment of this invention, the composite anode as described herein includes wherein the silicon is in the form selected from the group consisting of an Si powder, an Si nanowire, an Si nanoparticle, an Si sol particle, and an Si rod.

In another embodiment of this invention, the composite anode as described herein includes wherein the copper current collector working electrode is one material selected from the group consisting of a Cu grid, a Cu foil, and a Cu foam.

Another embodiment of this invention provides an electrophoretic deposition method of making a composite anode comprising providing at least one anode material comprising one or more of a carbon, a silicon, a conductive agent, and combinations thereof; placing at least one or more of the anode materials in an organic solution to form a suspension mixture of at least one of the anode material and the organic solution; immersing (i) a copper current collector working electrode, and (ii) a stainless steel counter electrode into the suspension mixture; delivering an effective amount of a direct current electric charge to the suspension mixture having the immersed working electrode and the counter electrode for a time period sufficient for charging the anode material and depositing the anode material on a surface of the working electrode for forming a composite anode; and optionally drying the composite anode. A preferred embodiment of this method includes placing the anode materials of carbon and silicon into the organic solution to form the suspension having carbon and silicon in the organic solution. In a more preferred embodiment of this method as described herein, the method includes wherein the molar ratio of the carbon to the silicon of the anode materials ranges from about 50:1 to 1:20.

As used herein, the organic solution may be any solution that contains carbon containing compounds, such as for example but not limited to a compound containing one or more hydro-carbon groups. A preferred organic solution is ethanol. Other organic solutions such as isopropyl alcohol, acetone or dimethyl formamide (DMF), and other hydrocarbon groups may be used in the EPD process.

In another embodiment of the method of this invention as described herein, the method includes wherein the conductive agent is one or more selected from the group consisting of a polyacrylonitrile (PAN), a polyaniline (PANI), an acetylene black, a carbon black, a super P, a poly(ethylene oxide), and a lithium hydroxide; the carbon is in the form selected from the group consisting of a graphite, a graphene, a carbon nanoparticle, a carbon nanotube, a carbon fiber, and a carbon rod; the silicon is in the form selected from the group consisting of an Si powder, an Si nanowire, an Si nanoparticle, an Si sol particle, an Si rod; and the copper current collector working electrode is one material selected from the group consisting of a Cu grid, a Cu foil, and a Cu foam.

Another embodiment of the present invention includes a lithium-ion battery comprising at least one cathode, and at least one anode, wherein at least one anode is a composite anode comprising (i) a copper current collector working electrode, (ii) at least one anode material comprising at least one of a carbon, a silicon, a conductive agent, and combinations thereof, wherein at least one of the anode materials is deposited on a surface of the copper current collector working electrode to form the composite anode. In a preferred embodiment of this invention, the lithium-ion battery as described herein includes wherein the anode material comprises both carbon and silicon. In a most preferred embodiment of the lithium-ion battery of this invention, as described herein, the lithium-ion battery includes both carbon and silicon as anode materials wherein the molar ratio of the carbon to the silicon of the anode materials ranges from about 50:1 to 1:20.

Other embodiments of the lithium-ion battery of the present invention, as described herein include wherein the conductive agent is one or more selected from the group consisting of a polyacrylonitrile (PAN), a polyaniline (PANI), an acetylene black, a carbon black, a super P, a poly(ethylene oxide, and a lithium hydroxide; the carbon is in the form selected from the group consisting of a graphite, a graphene, a carbon nanoparticle, a carbon nanotube, a carbon fiber, and a carbon rod; the silicon is in the form selected from the group consisting of an Si powder, an Si nanowire, an Si nanoparticle, an Si sol particle, and an Si rod; and the copper current collector working electrode is one material selected from the group consisting of a Cu grid, a Cu foil, and a Cu foam.

In this invention, new silicon-carbon based composite anodes are developed via highly efficient and electrophoretic deposition (EPD) method. The advantages of the proposed product are (1) cost effectiveness, (2) simplicity, and (3) eco-friendly manufacturing. The novelty of this invention lies mainly in the new microstructures and compositions of the silicon-carbon based composite anodes produced by EPD.

Figure 1:
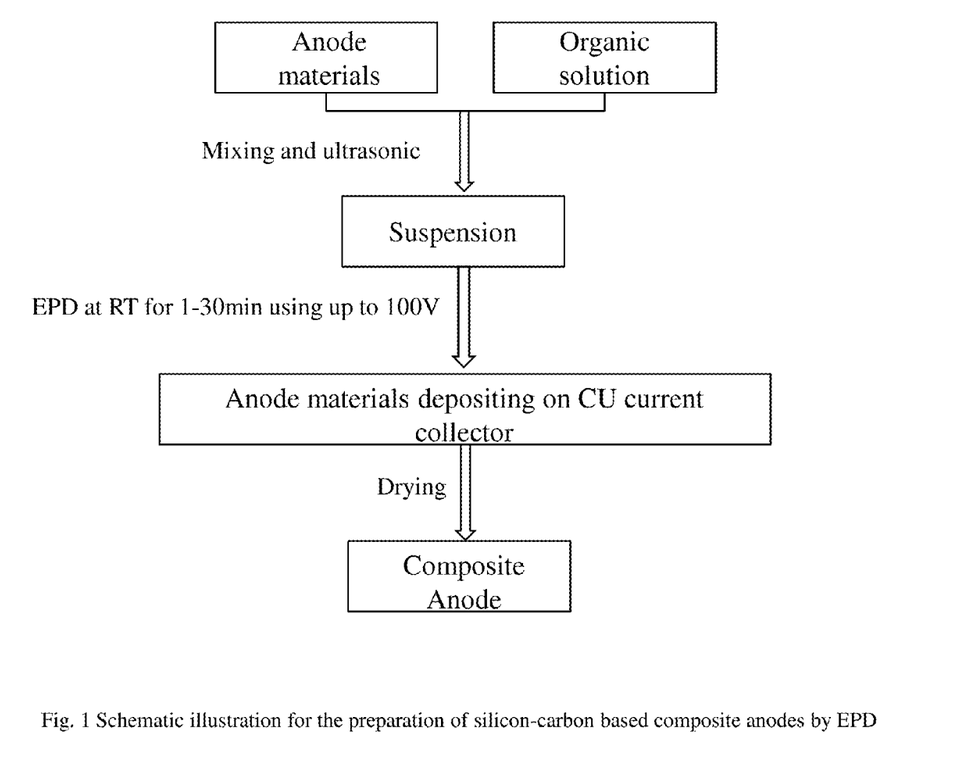
FIG. 1 is a schematic illustration showing the preparation of a silicon-carbon based composite anode of this invention.

The first step in the fabrication of silicon-carbon based composite anodes is the ultrasonic stirring of anode materials (carbon, silicon and/or other conductive agents) in an organic solution to form suspension solution. In the next step, copper current collector as work electrode, and stainless steel as counter electrode will be immersed into the above suspension and a dc voltage up to 100 V (volts) will be given for 1-30 minutes (min.) by a high voltage power source. Then, the charged anode materials will be drifted and deposited on the copper current collector at room temperature. Eventually, the silicon-carbon based composite anodes will be obtained by drying the copper current collector with anode materials. The fabrication process is shown in FIG. 1.

This invention provides low-cost, high performance anodes that can be used in different types of Li-ion batteries for electronic devices, automobile and other applications. This invention solves the high preparation cost and the difficulty of practical use in current Si—C composite anode.

The carbon, conductive agent, and silicon material species, the molar ratio of carbon and silicon, and the form of copper current collector will be changed to obtain different capacity and performance according to the requirements of Li-ion batteries. The carbon material species include graphite, graphene, carbon nanoparticles, carbon nanotubes, carbon fibers, or carbon rods. Conductive agents include polyacrylonitrile (PAN), polyaniline (PANI), acetylene black, carbon black, super P, poly(ethylene oxide), or lithium hydroxide. Silicon materials include Si powder, Si nanowires, Si nanoparticles, Si sol particles, or Si rods. Copper current collector involves Cu grid, Cu foil or Cu foam.

Preferably, when the anode materials of this invention include both carbon and silicon, the molar ratio of the carbon to the silicon ranges from about 50:1 to about 1:20.

As far as anode materials are concerned, graphite is commonly used in current commercial rechargeable Li-ion batteries. Although graphite showed low cost, good cycling performance as well as low electrochemical potential, its relatively low specific storage capacity limits current batteries from many potential applications. Finding new electrode material with higher capacity or higher energy density has been one of the most important research focuses. Silicon is an attractive alloy-type anode material because of its highest known capacity (4,200 mAh/g) and maximum Li uptake of Li/Si=4.4/1.0. This is a significant improvement over the 372 mAh/g provided by graphite. Unfortunately, lithium insertion into and extraction from silicon are accompanied by a huge volume change (up to 300%), which induces a strong stress on the silicon particles and causes pulverization and rapid capacity fading.

Most recently, substantial efforts have been devoted to developing silicon-carbon composite materials due to carbon's conductivity and its ability to accommodate Si volume changes. Especially, the employment of nano structured materials seems to be a possible way to solve the problem because nanostructured materials have usually a large pore volume that allows the digestion of huge volume expansion without causing mechanical fracture or cracking. However, most current silicon-carbon composite anode materials, only materials not anode, utilize chemical vapor deposition (CVD). The method requires not only high energy intensity, but also the use of toxic precursors. Other than those prepared by CVD, the silicon-carbon composite materials prepared by ball milling, electro spinning, or chemical reaction of gels would be subsequently heat-treated between 600 and 900° C. (centigrade). To protect Si from oxidizing at such temperature, the process must be carried out in vacuum or in the presence of inert gases, which further increase cost. Although significant progress has been made, it is unlikely that these anode materials can practically be applied in commercial batteries in the near future due to their poor reproducibility in mass production, and expensive and complicated fabrication process.

Figure 2:
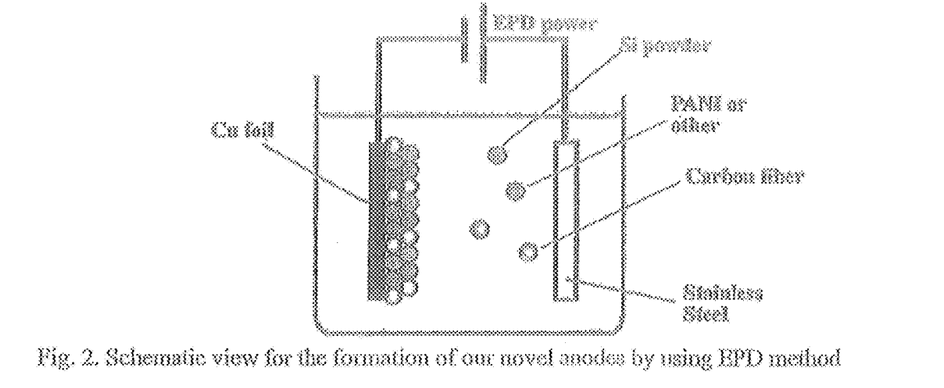
FIG. 2 is a schematic view of the formation of the composite anodes of this invention using electrophoretic deposition (hereinafter "EPD") method of this invention.

In a preferred embodiment of this invention, a novel design of a silicon-carbon based composite anode for high power and long-life Li-ion batteries by means of EPD. EPD is a versatile and "scale-up-ready" manufacturing technique that can produce crack-free overlay coatings of controlled thickness and porosity, uniform pore-distribution with improved microstructural homogeneity. In EPD, charged particles in an appropriate colloidal suspension (for example, a suspension having an organic solution such as ethanol) are typically drifted under the influence of a direct electric field towards an oppositely charged electrode, and deposit as a stable powder compact. The advantages of EPD technique include low cost, high efficiency (that means improvement on energy productivity), friendly environmental performance and simple manipulation. Unlike other silicon-carbon composite anode prepared through the formation of anode materials followed by heat treatment, pressing or other techniques, the silicon-carbon based composite anodes of the instant invention are easily obtained with different structures and compositions by only using EPD routes. FIG. 2 sets up the EPD example for the production of our composite anodes. Such anode can be directly used in Li-ion batteries to meet the continuous demands for having higher energy density and better cycling performance.

EXAMPLE 1

Preparation of Carbon Nanofiber Anodes 3.2 mg (milligrams) carbon nanofibers as active materials of our composite anode and 32 mg lithium hydroxide as conductive additives of EPD process (molar ratio is 1:5) were first dispersed in 40 mL (milliliter) ethanol. The resulting mixture was sonicated for 2 h (two hours) at room temperature to form a suspension (or solution). For an EPD process, T441 steel was used as counter electrode. The copper foil with the thickness of 15 microns attached on another T441 steel was used as the working electrode. Then the two electrodes were immersed into the suspension solution and a dc (direct current electric) voltage of 50 V (volts) was given for 10 min (minutes) by a high voltage power source (Lambpa, USA). Finally, carbon nanofibers were drifted and deposited on copper foil. After EPD, the copper foil joint with carbon nanofibers were taken out and dried at room temperature for 24 h (hour) to be used as Li-ion conduction anodes.

Surface Morphology

Figure 3:
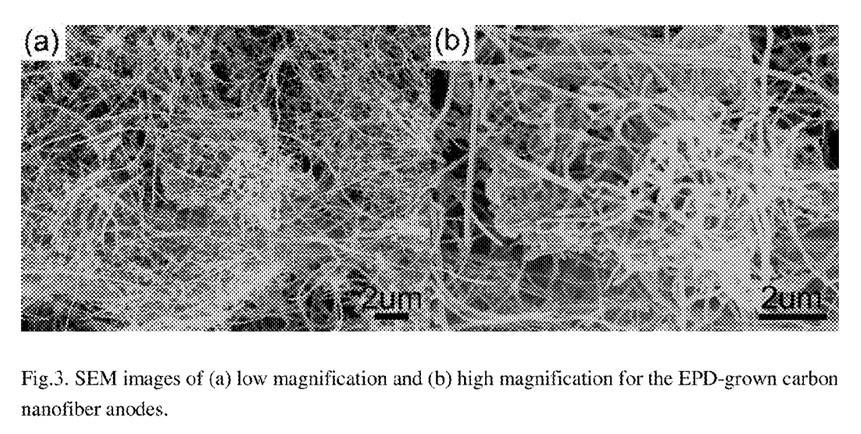
FIG. 3 shows scanning electron microscope images of (a) low magnification, and (b) high magnification for the electrophoretic deposition (EPD) method grown carbon fiber anode of this invention.

FIG. 3 shows scanning electron microscope (SEM) images of the EPD-grown carbon nanofiber anode. The anode has a smooth fibrous morphology (FIG. 3(*a*)). Especially, the high magnification image (at 10000× magnification) in FIG. 3(*b*) shows a 3D interconnected network with a porous structure. Such porous structure would allow high electrode material loading with better electrode-current collector adhesion.

Cycle Performance

For the charge-discharge analysis, two-electrode coin cells (2016) with Li foil as counter electrode were assembled in an argon-filled glove box (Labstar). The electrolyte consisted of 1 M LiPF6 in a solution of ethylene carbonate/diethyl carbonate (1:1 by volume), and a micro-porous separator (Celgard) was used between the carbon nanofiber anode and Li foil. Then the assembled cells were discharged and charged at the current rate of 1 C between 0 and 3 V (vs. Li/Li+) using an Arbin battery test station (BT2000).

Figure 4:
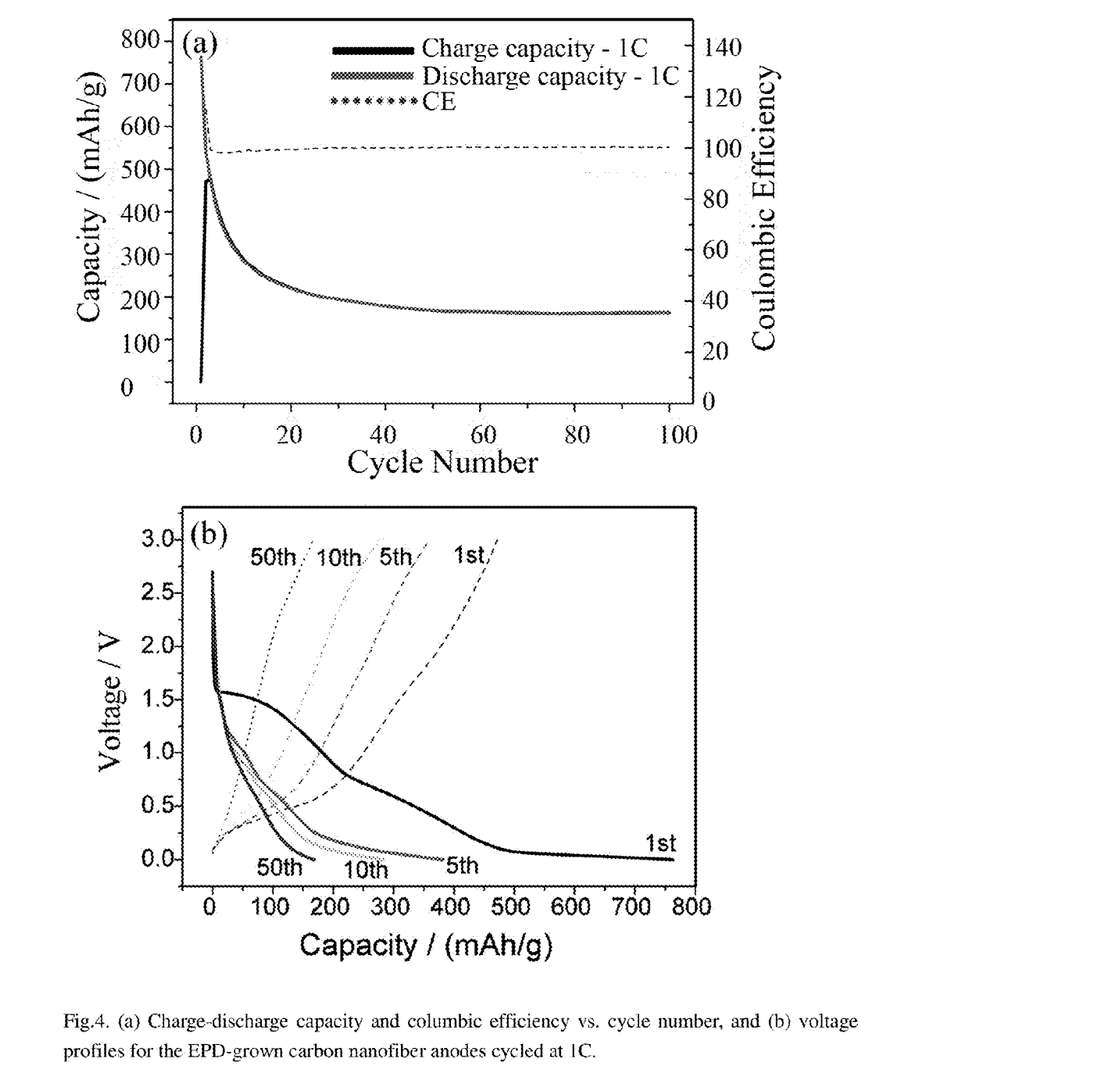

FIG. 4 shows the charge-discharge profiles of the EPD-grown carbon nanofiber anode including capacity, coulombic efficiency and voltage information. The charge and discharge capacity dropped drastically in the first 5 cycles. The EPD-grown carbon nanofiber anode delivered a discharge capacity of 763 mAh/g in the initial cycle and 160 mAh/g after 40 cycles. The relatively large irreversible capacity fading in the initial cycle could be explained by the formation of solid-electrolyte interface (SEI). In the subsequent cycles, the columbic efficiency remained about 100%.

EXAMPLE 2

Preparation of Silicon-carbon Nanofiber Composite Anodes

CNFs (carbon nanofibers) (3.2 mg) and lithium hydroxide (32 mg) and silicon powder (0.8 mg) (molar ratio is 1:5:0.1) were initially dispersed in 40 mL ethanol. Sonication was performed for 2 h (two hours) at room temperature to form the carbon-silicon composite suspension solution. The other EPD process is same as that described above in Example 1 to obtain silicon-carbon nanofiber composite anodes.

Surface Morphology

Figure 5:
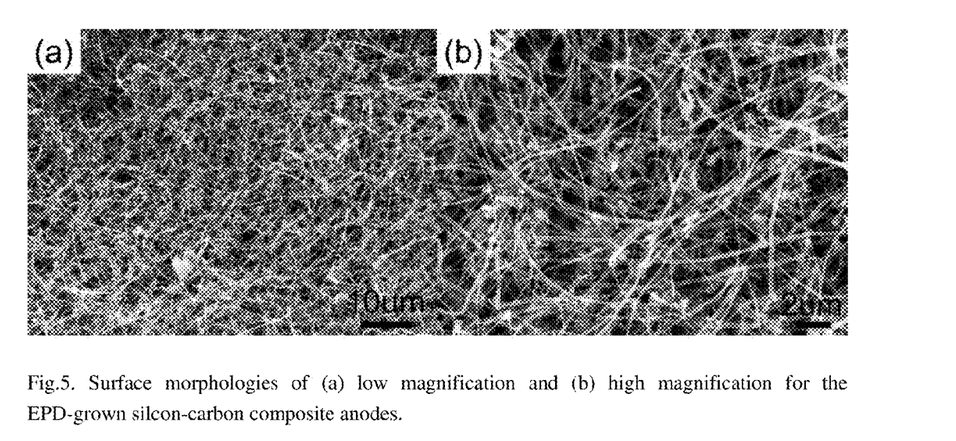
FIG. 5 shows surface morphologies of (a) low magnification, and (b) high magnification for the EPD method grown silicon-carbon composite anodes of this invention.

The surface morphology of the EPD-grown silicon-carbon composite anode is shown in FIG. 5. It can be observed that the nanometer-sized silicon particles are homogeneously dispersed within the carbon nanofiber matrix to form a 3D interconnected network. Moreover, carbon nanofibers are found to be shortened, which further increases the specific surface area and 3D networks of the composite anode. Besides materials itself, this structural feature would also be beneficial to host extra Li-ions in the composite anode due to the increase of the effective active area.

Cycle Performance

The cell assembly (2016) and electrochemical characterization of the silicon-carbon composite anode were performed to use the same process as shown in Example 1.

Figure 6:
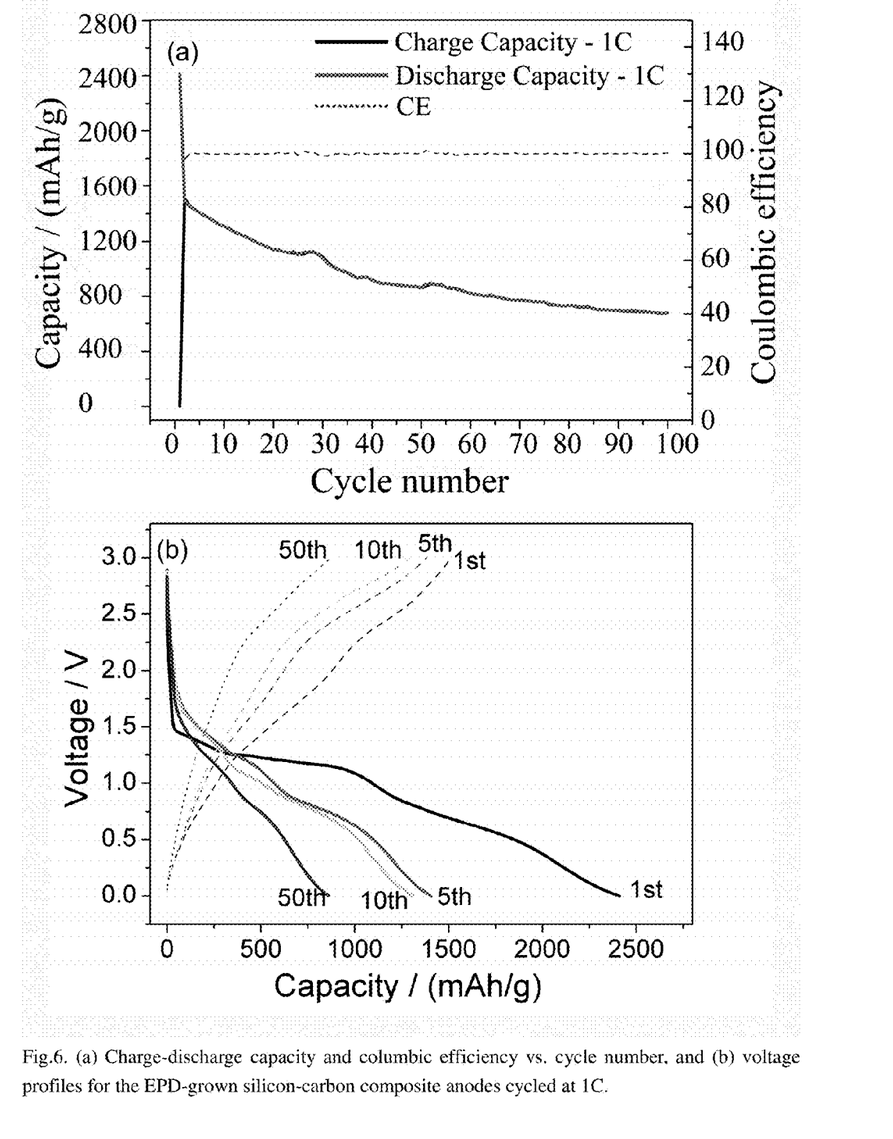

FIG. 6 shows the cycling performance of the EPD-grown silicon-carbon composite anode. The composite anode had a discharge capacity higher than 2400 mAh/g in the first cycle. Subsequently, the discharge capacity gradually decreased until 25 cycles. The capacity fading might be resulted from the decomposition of electrolyte and formation of SEI. After 25 cycles, the composite anode can deliver a relatively stable capacity and still achieve the capacity of 800 mAh/g after 100 cycles. The high capacity and coulombic efficiency of 100% after 100 cycles demonstrate the high reversibility and excellent capacity retention of the composite anodes. Comparing with the cycle results of the carbon nanofiber anode measured in the same voltage window, the stable capacity of the composite anode is about 400% higher. The improved performance could be attributed to the increased active area of the composite anode and the uniform distribution of Si powder.

The composite anodes of the present invention can be used in a variety of markets such as for example, but not limited to, in automobile batteries, and in batteries used to power consumer electronics (IPAD, laptops, etc.), as well as in batteries for stationary energy storage.

EXAMPLE 3

Preparation of Modified Silicon-carbon Nanofiber Composite Anodes

Figure 7:
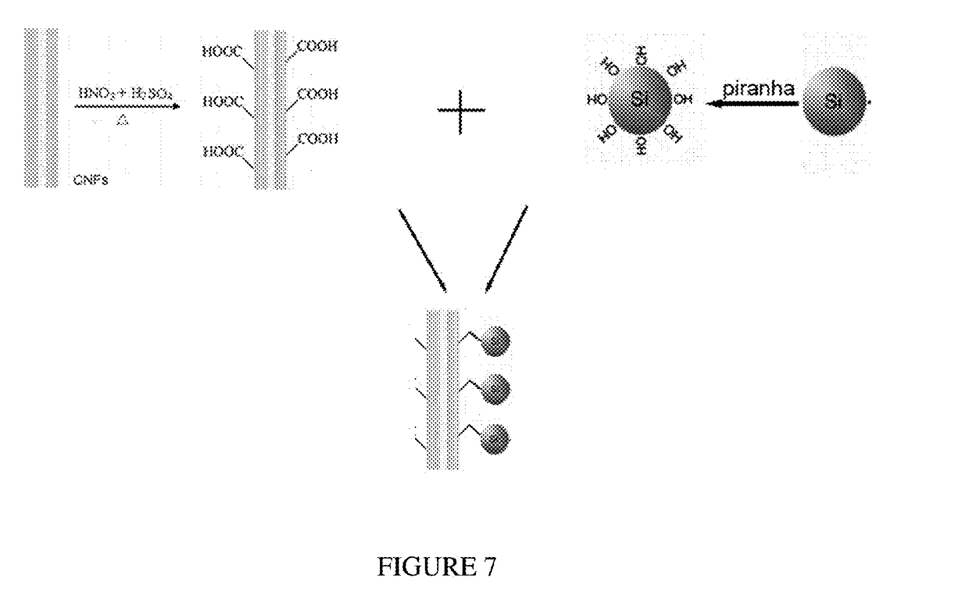
FIG. 7 shows a schematic of a preferred embodiment of this invention wherein the surfaces of CNFs and Si are pretreated with a pirana solution of $H_2SO_4/H_2O_2$ before the EPD process of Example 3.

In order to improve the distribution uniformity of silicon-carbon nanofiber composite anodes and enhance the bonding link between Si and CNFs, surface pretreatment is carried out before the EPD process for Si and CNFs materials, respectively. Firstly, CNFs (Sigma-Aldrich, D×L=100 nm×20~100 μm, 50 mg) and Si crystalline powders (Alfa Aesar, APS, 50 mg) were immerged in the mixture solution of $H_2SO_4$ and $HNO_3$ (3:1 in volume), and the piranha solution (2:1 in volume, $H_2SO_4/H_2O_2$), respectively. Rinsing was followed in deionized water and ethanol followed for three times. FIG. 7 is a schematic diagram that shows the effect of the surface pretreatment on CNFs and Si materials. Then, the pretreated CNFs (12 mg) and Si powders (1:2 in weight ratio) were dispersed in 150 mL ethanol to sonicate for 2 h (two hours). 120 mg lithium hydroxide (LiOH, Alfa Aesar) were also added to the ethanol solution above as the conductive agent. Thus, a well dispersed suspension solution was obtained for EPD process. Finally, modified silicon-carbon nanofiber composite anodes are formed by means of EPD, in which the process conditions are the same as that in Example 1.

Surface Morphology

Figure 8:
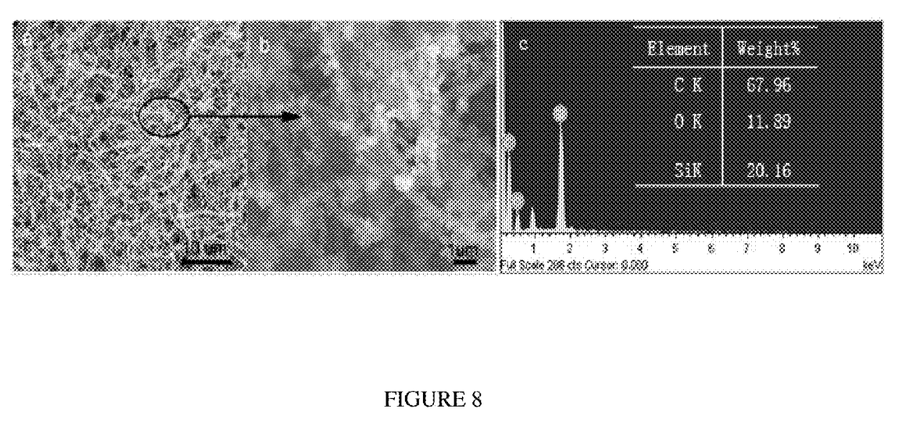

The surface image of the EPD-grown modified silicon-carbon composite anode is shown in FIGS. 8(a) and 8(b). FIG. 8(a) shows an SEM image of the EPD-grown modified silicon-carbon composite anode of the present invention of Example 3 at low magnification (2000×). FIG. 8(b) shows an SEM image of the EPD-grown modified silicon-carbon composite anode of the present invention of Example 3 at high magnification (10000×). It can be observed in FIGS. 8(a) and (b) that Si nanoparticles are well distributed in the CNFs network. In particular, the Si nanoparticles are closely attached on the surface of CNFs due to interaction between carboxyl groups on the CNFs and hydroxyl groups on the Si particles. This result indicates the surface pretreatment for CNFs and Si materials are obviously helpful to form good bonding force between them. FIG. 8(c) shows the EDX analysis results wherein the Si powder occupies for about 20.16% in weight in the composite anode, which is higher than the previous example.

Charge-Discharge Performance

Figure 9:
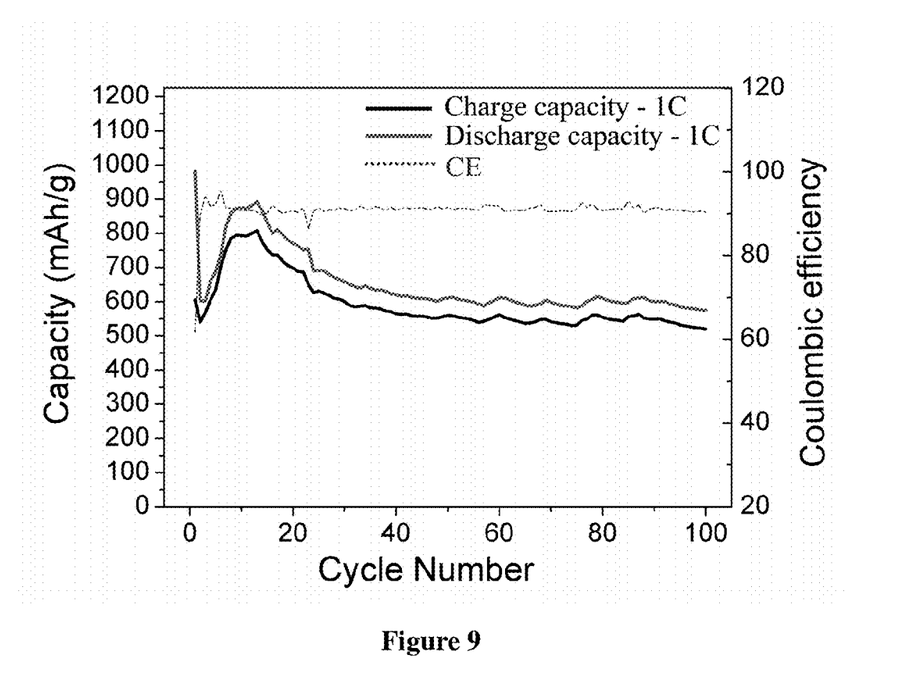
FIG. 9 shows a graph with the Charge-discharge capacity and columbic efficiency ("CE") (Y-axes of graph) versus cycle number (X-axis of graph) for the EPD-grown modified Silicon-carbon composite anode of Example 3.

The cell assembly (2016) and electrochemical characterization of the modified silicon-carbon composite anode were performed to use the same process as shown in Example 1. The charge-discharge curves of the EPD-grown modified silicon-carbon anode are exhibited including capacity information and coulombic efficiency in FIG. 9. Specifically, FIG. 9 shows Charge-discharge capacity and columbic efficiency vs. cycle number, for the EPD-grown modified silicon-carbon composite anodes of the present invention cycled at a current density of 0.4 A/g.

The 1st charge and discharge capacities of the Si/CNFs are about 601 mAh/g and 970 mAh/g, respectively, which corresponds to a coulombic efficiency of 62%. Within the first 10 cycles, both charge and discharge capacities decrease and then gradually increase. This could be attributed to initially poor wetting properties of the anode in electrolyte. Afterwards, the modified composite anode can deliver a stable capacity, and still achieve the capacity of 525 mAh/g for charge and 574 mAh/g for discharge after 100 cycles. Compared to the anode in Example 2, the modified composite anode shows better capacity retention and more stable cycle performance.

We claim:

1. An electrophoretic deposition method of making a composite anode comprising:
   providing at least one anode material comprising one or more of a carbon and one or more of a silicon;
   placing one or more of said carbon and one or more of said silicon in a pretreatment solution comprising $H_2SO_4$ and $H_2O_2$;
   rinsing one or more of said pretreated carbon and one or more of said pretreated silicon;
   placing at least one or more of said anode materials in an organic solution to form a suspension mixture of at least one of said anode material and said organic solution;
   immersing (i) a copper current collector working electrode, and (ii) a stainless steel counter electrode into said suspension mixture; and
   delivering an effective amount of a direct current electric charge to said suspension mixture having said immersed working electrode and said counter electrode for a time period sufficient for charging said anode material and depositing said anode material on a surface of said working electrode for forming a composite anode.

2. The method of claim 1 including placing said anode materials of carbon and silicon into said organic solution to form said suspension having carbon and silicon in said organic solution.

3. The method of claim 2 including wherein the molar ratio of said carbon to said silicon of said anode materials ranges from about 50:1 to 1:20.

4. The method of claim 1 including wherein said anode materials further comprise one or more conductive agent selected from the group consisting of a polyacrylonitrile (PAN), a polyaniline (PANI), an acetylene black, a carbon black, a super P, a poly(ethylene oxide), and a lithium hydroxide.

5. The method of claim 1 including wherein said carbon is in the form selected from the group consisting of a graphite, a graphene, a carbon nanoparticle, a carbon nanotube, a carbon fiber, and a carbon rod.

6. The method of claim 1 including wherein said silicon is in the form selected from the group consisting of an Si powder, an Si nanowire, an Si nanoparticle, an Si sol particle, and an Si rod.

7. The method of claim 1 including wherein said copper current collector working electrode is one material selected from the group consisting of a Cu grid, a Cu foil, and a Cu foam.

8. The method of claim 3 including wherein the molar ratio of said carbon to said silicon of said anode materials is about 1:0.1.

9. The method of claim 1 including wherein said carbon is in the form of a carbon nano fiber.

10. The method of claim 9 including wherein said silicon is in the form of an Si powder.

11. The method of claim 1 including wherein said silicon is in the form of an Si powder.

12. The method of claim 1 further comprising drying said composite anode.

13. The method of claim 2 including placing lithium into said organic solution to form said suspension having carbon, silicon, and lithium in said organic solution.

* * * * *